United States Patent
Roberts et al.

(10) Patent No.: US 12,012,062 B2
(45) Date of Patent: Jun. 18, 2024

(54) RADAR DETECTION OF CHILD CAR SEAT CONDITIONS IN A VEHICLE

(71) Applicants: Toyota Connected North America, Inc., Plano, TX (US); Toyota Motor North America, Inc., Plano, TX (US)

(72) Inventors: Simon P. Roberts, Celina, TX (US); Yang Ding, Montreal (CA); Daniel W. Reaser, Oak Point, TX (US); Christopher J. Macpherson, Plano, TX (US); Keaton Khonsari, Dallas, TX (US); Derek A. Thompson, Dallas, TX (US); Sergei I. Gage, Redford, MI (US)

(73) Assignees: Toyota Motor North America, Inc., Plano, TX (US); Toyota Connected North America, Inc., Plano, TX (US)

( * ) Notice: Subject to any disclaimer, the term of this patent is extended or adjusted under 35 U.S.C. 154(b) by 127 days.

(21) Appl. No.: 17/341,123

(22) Filed: Jun. 7, 2021

(65) Prior Publication Data
US 2022/0388465 A1    Dec. 8, 2022

(51) Int. Cl.
*B60R 22/00*    (2006.01)
*B60R 21/015*    (2006.01)
(Continued)

(52) U.S. Cl.
CPC .. *B60R 21/01554* (2014.10); *B60R 21/01512* (2014.10); *B60R 21/16* (2013.01);
(Continued)

(58) Field of Classification Search
CPC ........ B60R 21/01554; B60R 21/01512; B60R 21/16; B60R 2021/01204; G01S 7/412; G01S 13/88
See application file for complete search history.

(56) References Cited

U.S. PATENT DOCUMENTS

| | | | |
|---|---|---|---|
| 6,757,602 B2 | 6/2004 | Breed et al. | |
| 2002/0089157 A1* | 7/2002 | Breed ................ | B60N 2/888 280/735 |

(Continued)

OTHER PUBLICATIONS

Vayyar, "The Baby Didn't Know She's Been Left in the Car. But the Car Knew (and more)", found at: https://vayyar.com/auto/ (accessed Jun. 7, 2021).
(Continued)

*Primary Examiner* — Adam M Alharbi
(74) *Attorney, Agent, or Firm* — Christopher G. Darrow; Darrow Mustafa PC

(57) ABSTRACT

A system for controlling operation of a vehicle includes a millimeter-wave radar sensor, a processor, and a memory communicably coupled to the processor. The memory stores a sensor control module configured to automatically control operation of the radar sensor to perform at least one radar scan of at least a portion of an interior of the vehicle. The sensor control module is also configured to determine, using information acquired by the at least one radar scan of the vehicle interior, at least one characteristic of a child car seat positioned in the interior. The sensor control module is also configured to compare the at least one determined characteristic of the child car seat with child car seat comparison information and, responsive to the comparison of the at least one determined characteristic with the child car seat comparison information, control an operation of the vehicle.

17 Claims, 6 Drawing Sheets

(51) Int. Cl.
  *B60R 21/16* (2006.01)
  *G01S 7/41* (2006.01)
  *G01S 13/88* (2006.01)
  *B60R 21/01* (2006.01)

(52) U.S. Cl.
  CPC .............. *G01S 7/412* (2013.01); *G01S 13/88* (2013.01); *B60R 2021/01204* (2013.01)

(56) References Cited

U.S. PATENT DOCUMENTS

| | | | |
|---|---|---|---|
| 2004/0129478 A1* | 7/2004 | Breed | B60R 22/20 180/273 |
| 2005/0275554 A1 | 12/2005 | Patterson et al. | |
| 2009/0234542 A1 | 9/2009 | Orlewski | |
| 2020/0094761 A1 | 3/2020 | Tasovac et al. | |
| 2020/0180472 A1 | 6/2020 | Lu-Dac et al. | |
| 2020/0269795 A1* | 8/2020 | Angermayer | B60R 11/04 |
| 2020/0339056 A1* | 10/2020 | Kriger | B60R 21/01516 |
| 2020/0353940 A1 | 11/2020 | Kim et al. | |

OTHER PUBLICATIONS

Galdia et al., "Localization of Passengers Inside Intelligent Vehicles by the Use of Ultra Wideband Radars", Signal Processing, Image Processing and Pattern Recognition. SIP 2011. Communications in Computer and Information Science, vol. 260. Springer, Berlin, Heidelberg.

Alizadeh et al., "Low-cost low-power in-vehicle occupant detection with mm-wave FMCW radar," found at: arXiv:1908.04417v1 [eess.SP] Aug. 12, 2019.

Kishore, "Using TI mmWave technology for car interior sensing" found at: https://e2e.ti.com/blogs_/b/behind_the_wheel/posts/ti-mmwave-technology-for-car-interior-sensing, (accessed May 14, 2021).

Vayyar "Vayyar Becomes First and Only Company in the World to Offer Full-cabin Monitoring with One-Radar-on-Chip", found at: https://blog.vayyar.com/vayyar-single-chip-three-rows, pp. 1-5, dated Mar. 24, 2021 (accessed May 13, 2021).

Kishore, Detecting Vehicle Occupancy with mmWave Sensors, Apr. 30, 2018, pp. 1-4, https://e2e.ti.com/blogs_/b/behind_the_wheel/posts/detecting-vehicle-occupancy-with-mmwave-sensors#:~:text=Detecting vehicle occupancy with mm (accessed May 17, 2021).

"Ignition Interlock Devices" article, found at: https://www.michigandefenselaw.com/ignition-interlock-devices.html (accessed May 13, 2021).

"Ignition Interlock" article, found at: https://www.loadingzonesafety.com/ignition-interlock (accessed May 14, 2021).

* cited by examiner

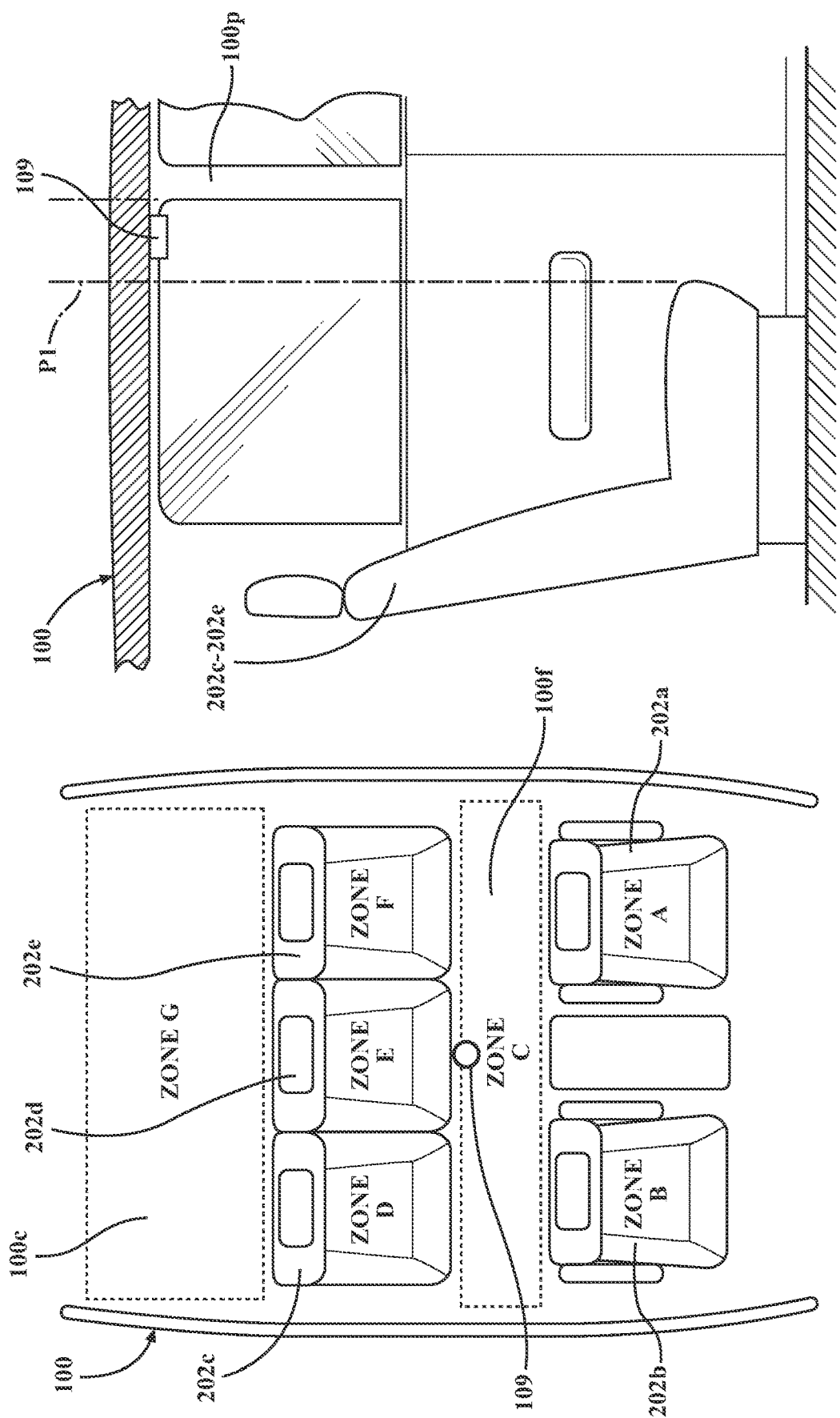

RADAR DETECTION OF CHILD CAR SEAT CONDITIONS IN A VEHICLE

TECHNICAL FIELD

The subject matter described herein relates to autonomous control of vehicle sensors and vehicle operations responsive to sensor data. More particularly, the subject matter described herein relates to control of operation of one or more millimeter-wave radar sensors to scan an interior of a vehicle to detect or determine conditions relating to child car seats and child seating arrangements in the vehicle.

BACKGROUND

Due to the number of rules and guidelines governing the use of child car seats and the fact that these rules and guidelines may change suddenly and without notice, it may be impractical for an average user to become informed and/or stay informed regarding all of the applicable rules and guidelines. Lack of awareness regarding one or more car seat guidelines or regarding the unsuitability of a child car seat configuration currently in the vehicle may result in a monetary fine or even injury to a child secured in the car seat.

SUMMARY

In one aspect of the embodiments described herein, a system for controlling operation of a vehicle is provided. The system may include a millimeter-wave radar sensor, a processor, and a memory communicably coupled to the processor. The memory may store a sensor control module including computer-readable instructions that when executed by the processor cause the processor to automatically control operation of the radar sensor to perform at least one radar scan of at least a portion of an interior of the vehicle. The sensor control module may also be configured to determine, using information acquired by the at least one radar scan of the vehicle interior, at least one characteristic of a child car seat positioned in the interior. The sensor control module may also be configured to compare the at least one determined characteristic of the child car seat with child car seat comparison information and, responsive to the comparison of the at least one determined characteristic with the child car seat comparison information, control an operation of the vehicle.

In another aspect of the embodiments described herein, a method of controlling operation of a vehicle is provided. The method includes a step of automatically controlling operation of a millimeter-wave radar sensor to perform at least one radar scan of at least a portion of an interior of the vehicle. Using information acquired by the at least one radar scan of the vehicle interior, at least one characteristic of a child car seat positioned in the interior is determined. The at least one determined characteristic of the child car seat is then compared with child car seat comparison information and, responsive to the comparison of the at least one determined characteristic with the child car seat comparison information, an operation of the vehicle is controlled.

In yet another aspect of the embodiments described herein, a non-transitory computer readable medium is provided. The medium contains stored instructions that when executed by a computing system, cause the computing system to perform functions including automatically controlling operation of a millimeter-wave radar sensor to perform at least one radar scan of at least a portion of an interior of the vehicle. The functions also include determining, using information acquired by the at least one radar scan of the vehicle interior, at least one characteristic of a child car seat positioned in the interior. The functions also include comparing the at least one determined characteristic of the child car seat with child car seat comparison information and, responsive to the comparison of the at least one determined characteristic with the child car seat comparison information, controlling an operation of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2 is a schematic plan view of a vehicle interior showing an exemplary vehicle seating arrangement of five seats in associated seating zones A, B, and D-F, along with an additional floor zone C and cargo zone G.

FIG. 4 is a schematic cross-sectional side view of a vehicle interior showing a positional arrangement of a MMW radar sensor in accordance with an embodiment described herein.

DETAILED DESCRIPTION

Embodiments described herein relate to a system designed to determine conditions relating to child car seats and child seating in a vehicle interior or occupant compartment. A millimeter-wave radar sensor may be controlled to scan the vehicle interior for detecting a child car seat and a child (if present). Various conditions and values of various parameters may be determined through an analysis of information provided by the radar scan. These conditions and parameters values may be compared with stored information describing and relating to federal, state, local, and other rules and guidelines pertaining to the appropriate selection and use of child car seats and the seating of children in a vehicle. Based on results of the comparisons, operations of the vehicle (such as generation of alerts, conditional delays of vehicle movement commands, and other operations) may be automatically controlled or controlled interactively with the user.

As used herein, to "determine" or "determining" a dimension or a value of a parameter means that the various modules, components, and systems (e.g., radar sensor(s) 109, sensor control module 117, etc.) of the vehicle 100 are capable of detecting or calculating the dimension or parameter value with a degree of accuracy and/or certainty great enough to enable performance of the operations, evaluations, and functions described herein. Thus, for example, while a value of a dimension such as child height derived from an analysis of radar scan data may differ to a small degree from a value determined by physically measuring the child, the difference in the measured values will be so small that the operations, evaluations, and functions described herein may still be accurately and reliably performed based on the detected or derived dimension or parameter value.

Figure 1:
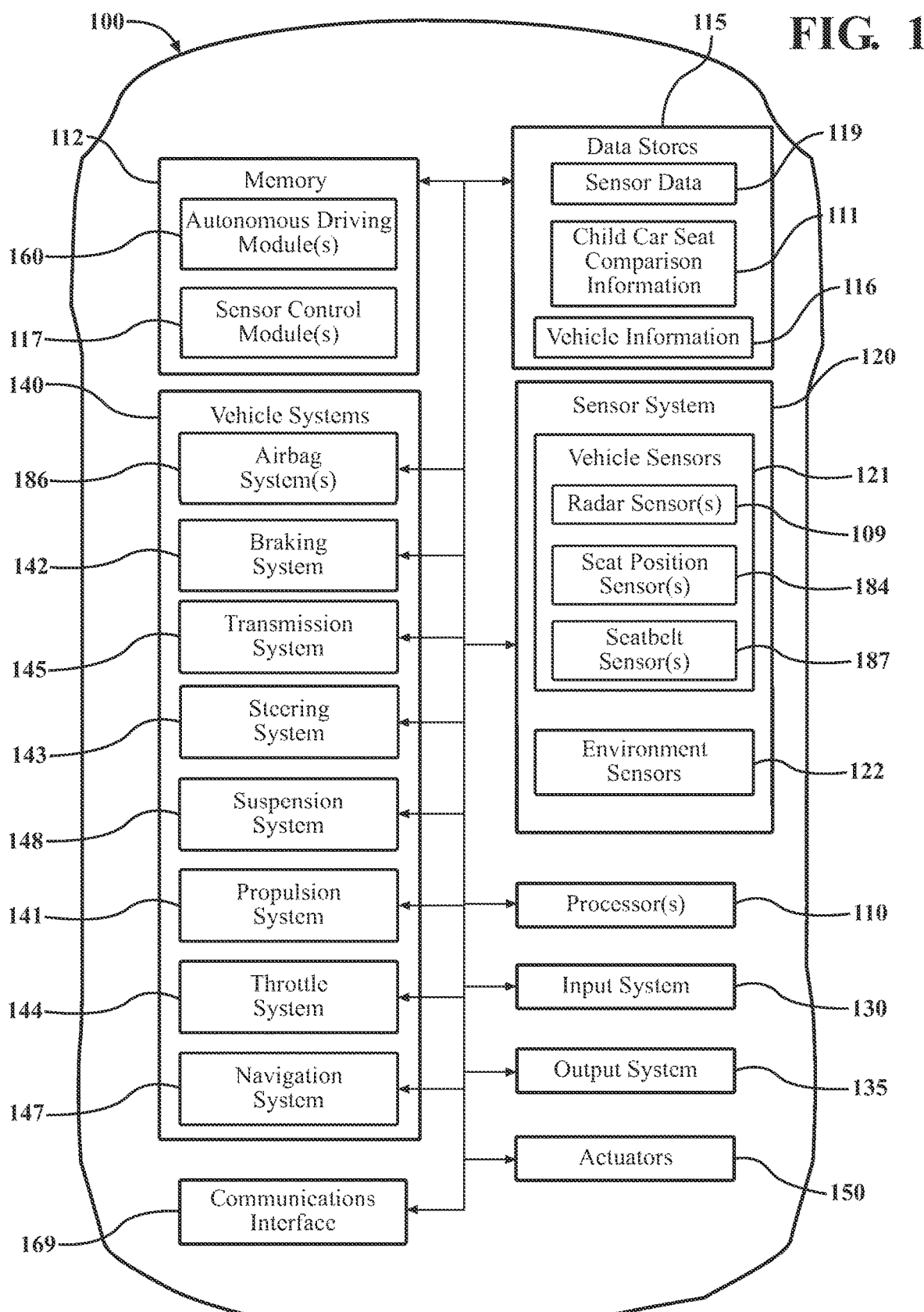
FIG. 1 is a schematic view of a vehicle incorporating a system for controlling one or more vehicle sensors for monitoring an interior or occupant compartment of the vehicle and controlling operations of the vehicle responsive to sensor data, in accordance with embodiments described herein.

Referring to FIG. 1, an example of a vehicle 100 is illustrated. As used herein, a "vehicle" is any form of motorized transport. In one or more implementations, the vehicle 100 is conventionally-powered or hybrid passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a system for controlling one or more vehicle sensors for monitoring an occupant compartment of the vehicle, in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processor(s) 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

The one or more data store(s) 115 can include vehicle information 116. The vehicle information 116 can include any information relating to the vehicle 100 which enables and/or facilitates operation of the radar sensor 109, the sensor control module 117 and/or any of component or system of the vehicle in performance of any of the functions and operations described herein. For example, vehicle information 116 may include information relating to interior zone boundaries and dimensions (including seating zones A, B, and D-F, floor zone C, cargo zone G, and other predefined zones (if any), locations of various vehicle surfaces (such as seating surfaces and surfaces from which airbags may be deployed) with respect to the radar sensor and/or with respect to other surfaces or locations in the vehicle interior, a maximum attainable distance which a front passenger seat bottom may be positioned from the dashboard or other surface from which an airbag positioned opposite and forwardly (i.e., in a direction toward a front end of the vehicle) of the front passenger seat may deploy, and other pertinent information.

The one or more data store(s) 115 can include child car seat comparison information 111. "Child car seat comparison information" may be information relating to child car seats and seating of a child therein. Such information may be obtained from standards, laws, recommendations, and guidelines pertaining to child car seats and processed into a form which facilitates comparison with information detectible by and/or derived from radar scans, as described herein.

Guidelines and laws regulating construction and use of child car seats may be promulgated by various federal, state, and local sources. For example, some regulations and guidelines pertaining to child car seats may be found at https://www.nhtsa.gov/equipment/car-seats-and-booster-seats, which contains guidelines promulgated by NHTSA (the National Highway Traffic Safety Administration). Types of child car seat comparison information which may be provided by guidelines and laws include a direction which each type of seat should be facing according to a given position in the vehicle, child weight, child size and/or child age; the proper size and type of child car seat for a child of given weight/age and dimensions; recommended positions of children and child car seats in the vehicle according to age and size, and other pertinent information.

In one or more arrangements, provisions of child car seat rules and guidelines (such as suitable positions of various types of car seats in the vehicle, car seat structural dimensions, conditions under which a car seat may face forwardly rather than rearwardly, etc.) may be processed or adapted into a form which facilitates comparison with corresponding existing car seat features which are either detectible by the radar sensor or determinable from the radar sensor data. Such processed or adapted provisions are referred to herein collectively as "child car seat comparison information 111".

Figure 5:
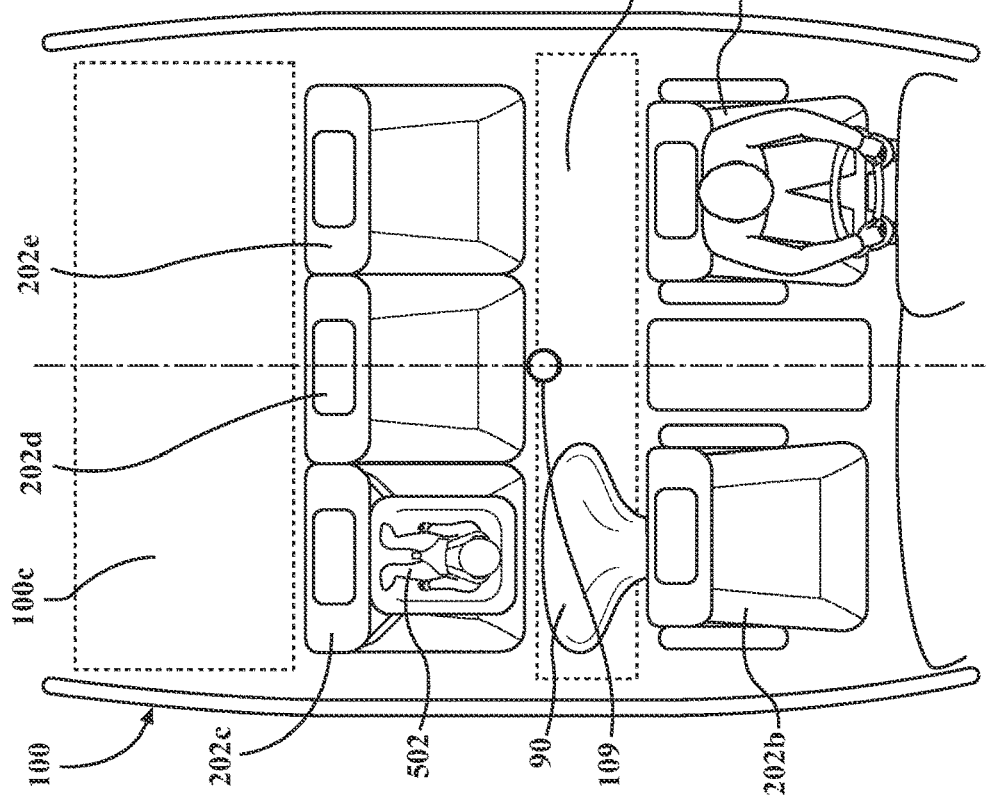
FIG. 5 is a schematic plan view of the vehicle similar to the view of FIG. 2, showing a child in a rearwardly-facing child car seat positioned in one of the rear seating zones, and showing deployment of an airbag from a rear portion of the front passenger seat.

In one example, an applicable guideline may state that a child below age 2 or having a weight below 40 lbs. is to be secured in a rear-facing child car seat located in a rear seating zone (such as child 502 located in seating zone D in FIG. 5). As part of child car seat comparison information 111, a unique identifier may be assigned to represent each child car seat characteristic (for example, orientation, position (seating zone), etc.) and values may be assigned to each identifier to represent various states of the characteristic.

For example, a variable S1 representing an orientation of the car seat may have a value of "1" for rear-facing and "2" for forward-facing. Appropriate values of this characteristic to be stored in child car seat comparison information 111 may be assigned based on such factors as a seating zone in which the car seat is located, the type of car seat, and/or (if available) the height and weight of the child. Thus, appropriate values of S1 for a given car seat type, seating zone, and child height and weight may be stored in the child car seat comparison information 111.

Information acquired from a radar scan may indicate that a car seat is located in seating zone D (FIG. 2) and that the car seat is a front-facing infant only car seat (i.e., S1=2). Since an infant-only car seat positioned in a rear seating zone should only face toward the rear, the child car seat comparison information 111 may indicate that the only appropriate value for S1 for an infant-only car seat located in zone D is "S1=1". Thus, a comparison of the characteristics determined by the radar scan with the appropriate corresponding characteristics as determined by the guidelines and stored in memory will indicate that the car seat detected by the radar scan is facing the wrong way. Responsive to this determination, an operation of the vehicle may be controlled (for example, operation of the output system 135 may be controlled to generate an alert indicating that the child car seat detected by the radar scan in seating zone D is facing the wrong way).

In another example, a variable W1 may represent whether or not a child car seat is positioned in the vehicle interior, with a value of "1" indicating the presence of a child car seat and a value of "2" indicating the absence of a child car seat. Appropriate values of this characteristic to be stored in child car seat comparison information 111 may be assigned based on such factors as a height and weight of a child detected in the vehicle interior by the radar sensor. Thus, appropriate values of W1 for a given child height and weight may be stored in the child car seat comparison information 111.

A radar scan of the interior may detect a child seated in a conventional vehicle seat rather than in a child car seat (i.e., W1=2). Information acquired from a radar scan may indicate that the child's weight is 25 lbs. However, for a child weighing only 25 lbs., the child car seat comparison information 111 may indicate that the only appropriate value for W1 is "W1=1", because a child weighing only 25 lbs. should be secured in a child car seat. Thus, a comparison of the characteristics determined by the radar scan with the appropriate corresponding characteristics as determined by the guidelines and stored in memory will indicate that the child is improperly seated in the vehicle, and that the child should be seated in a child car seat. Responsive to this determination, an operation of the vehicle may be controlled (for example, operation of the output system 135 may be controlled to generate an alert indicating that the child should be seated in a child car seat). The alert may also be configured to suggest an associated type of seat, a positioning of the car seat, and an orientation of the car seat which satisfies the applicable guidelines.

In yet another example, a variable T1 may represent a type of child car seat. The type of child car seat positioned in the vehicle may be determined from radar scan information. In addition, characteristics (such as height and weight) of a child seated in the car seat may be determined from a radar scan. Information stored in the child car seat comparison information 111 may associate the height and weight of a child with appropriate types of child car seats and appropriate pertinent dimensions of car seats of each type. A comparison of the detected car seat type and child height and weight with the appropriate car seat and child characteristic information stored in the child car seat comparison information 111 may determine that the child car seat detected by the radar scan is inappropriate for a child having the height and weight of the child detected in the vehicle (e.g., the child may have outgrown the current child car seat). Responsive to this determination, an operation of the vehicle may be controlled (for example, operation of the output system 135 may be controlled to generate an alert indicating that the child car seat in which the child is currently seated is inappropriate for a child having the determined height and weight).

Any of a variety of alternative classification and/or comparison methods may be used. In the manner just described, by comparing child and child car seat information determined from radar scans with related information stored in the child car seat comparison information 111, errors in the type of car seat, size of car seat, location or position of the car seat, and orientation of the car seat may be identified and brought to the attention of a user for correction.

Some or all of the available child car seat comparison information 111 may be stored locally in data stores 115, or portions of the information may be stored off-vehicle (for example, in cloud storage) for access on demand by a user or as needed by the vehicle 100 in processing radar data. Such information may be constantly updated and stored in the cloud or downloaded into child car seat comparison information 111 in the data stores.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor(s) to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system can acquire data of the vehicle occupant compartment, such as the number and positions of occupants, whether or not an occupant is out of position, detection of living objects, and other data described herein. The sensor system 120 can also acquire data of at least a portion of the external environment of the vehicle 100 (e.g., nearby objects).

The sensor system 120 can include any suitable type of sensor. Various examples of different types of sensors will be described herein. However, it will be understood that the embodiments are not limited to the particular sensors described or to the particular sensors shown in FIG. 1. The example sensors may be part of the one or more environment sensors 122 and/or the one or more vehicle sensors 121. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility. The sensors may also be operably connected to other vehicle systems and components, such as data stores 115 and processor(s) 110, for storage and processing of vehicle and environmental sensor data. Sensor system 120 may include sensors configured to detect the current state or status of vehicle systems and components and to generate indications (for example, using trouble codes) possible malfunctions of vehicle systems and components.

The sensor system 120 can include one or more vehicle sensors 121. The vehicle sensor(s) 121 can detect, determine, and/or sense information about the vehicle 100 itself and/or any occupants inside the vehicle. In one or more arrangements, the vehicle sensor(s) 121 can be configured to detect events and conditions in the vehicle occupant compartment. The occupant compartment or interior of the vehicle may comprise the enclosure in which the vehicle seats are located and/or in which vehicle occupants reside during travel in the vehicle.

In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed.

The vehicle sensor(s) 121 may include sensors configured to detect conditions and/or events inside the vehicle interior or occupant compartment. Sensor system 120 may include seatbelt sensors 187 configured to detect buckled and unbuckled conditions of the vehicle seatbelts. The status ("buckled" or "unbuckled") of a seat belt located in the same seating zone as a child car seat may serve as an indication regarding whether or not the car seat is properly secured in the vehicle. Sensor system 120 may also include seat position sensors 184 configured to determine a current position of one or more seats (for example, a front passenger seat) relative to forwardly-most and rearwardly-most positions or limits of the seat(s).

Embodiments of a system for controlling an operation of the vehicle 100 described herein may incorporate one or more millimeter-wave (MMW or mm-wave) radar sensor(s) 109 to scan the interior of the vehicle and acquire data usable for the purposes described herein. Millimeter-wave radar generally refers to a radar operating in the millimeter-wave band. Generally, the millimeter-wave band is in the frequency domain of 30-300 GHz (wavelength of 1-10 mm). In particular arrangements, a MMW radar sensor usable for the purposes described herein may operate within a frequency range of 60-GHz to 80-GHz inclusive. In one or more arrangements, a single radar sensor 109 may be employed to acquire data for use in acquiring data and performing the operations described herein. However, more than one radar sensor may also be used in different sensor configurations (for example, to increase the resolution of the system).

MMW radar is a radar technology which uses three-dimensional cloud point mapping and analysis to detect objects and object movements. For instance, MMW radar may be configured to detect an object that other types of sensors (for example, an ordinary camera) cannot because the radar can penetrate at least a portion of the material from which a vehicle seat is formed. The point cloud may be generated from the radar scan data using known methods. Object location, dimensional, and density data may be represented in distinguishable characteristics of each voxel in a point cloud. The density data may enable the radar to determine or estimate characteristics of an object such as a material from which the object is formed and also other characteristics.

The MMW radar sensor 109 may be configured to detect subtle changes in the generated point cloud configurations, corresponding to slight movements of the detected objects within the vehicle interior. Conventional cameras, lasers, and ultrasonic sensors may not be capable of detecting such movements. The MMW radar 109 may be configured to detect individual objects and vehicle occupants and their locations within the vehicle interior, and to determine whether a detected object is living or inanimate. Each occupant may be represented as an associated generated point cloud, the configuration of which may change corresponding to movement of the occupant as detected by successive radar scans. Thus, movements of an object over time may be monitored by successive radar scans and evaluation of associated point clouds. In one particular example, the radar sensor 109 may be capable of detecting movements of an occupant's chest during respiration.

The radar sensor 109 may be configured to scan for objects having particular characteristics such as living objects smaller than a predetermined size. The radar sensor 109 may be configured to distinguish features such as the locations and sizes of individual occupants. The MMW radar 109 may also be configured to detect occupant characteristics such as density, length, and width or girth. Using these parameters, the weight of an occupant may be estimated. In addition, the MMW radar may be configured to determine whether an occupant is an adult, a child or an infant. The radar sensor 109 may be configured or trained to detect whether or not an occupant is seated.

Radar sensor 109 may be configured to detect when an occupant is out of position. For example, the radar sensor 109 may be configured to detect motions of a torso of an occupant. Any displacement of an occupant torso, either vertically or horizontally, beyond an associated predetermined threshold amount in relation to a known location of a vehicle seat may indicate that the occupant is unseated. If an occupant is determined to be unseated while the vehicle is moving, the occupant may be deemed to be out of position. "Out-of-position" may be otherwise defined in any suitable manner, for example, situationally and in consideration of a particular vehicle occupant compartment design.

In another example, if vehicle seat is determined to be occupied at a first point in time while the vehicle is moving and the seat is subsequently determined to be unoccupied while the vehicle is still moving, it may be determined that an occupant has left the seat while the vehicle is moving and is, therefore, out of position.

In yet another example, certain zones or portions of the occupant compartment may be predefined as locations where a torso of an occupant should not reside when the vehicle is moving. If a vehicle sensor determines that the torso of an occupant is in one of these regions while the vehicle is moving, the occupant may be deemed to be out of position.

FIG. 4 is a schematic cross-sectional side view of a vehicle interior showing a positional arrangement of a MMW radar sensor in accordance with an embodiment described herein. in the arrangement shown, the sensor may be positioned aft of the vehicle "B"-pillar and forward of a vertical plane P1 extending along a forward-most edge of the vehicle rear seats 202*c*-202*e*. However, the radar sensor 109 may be positioned in any of several other locations, depending on the requirements of a particular application.

In particular configurations, the radar sensor 109 may operate as an imaging radar within the frequency range of 60-GHz to 80-GHz for purposes of scanning the vehicle occupant compartment as described herein. A single sweep of the radar scanner may scan the entire portion of the vehicle occupant compartment detectable in the field of vision of the radar sensor. A single sweep of the sensor and associated processing may produce a single frame of data. In one or more configurations, the radar sensor 109 may operate at about 5 frames/per second (i.e., 5 sweeps per second). Operating under these parameters, it is desirable to acquire data for a period of 5-10 seconds to facilitate removal of anomalies from the data and provide a clear image. Thus, a "scan" may comprise enough sweeps to provide sufficient data to facilitate removal of anomalies from the data and provide a clear image. In one or more configurations, the maximum scanning rate is 5 sweeps per second.

In particular configurations, radar sensor power consumption may be between 170-280 mA per frame for active scanning at 5 sweeps/second at 12 volts DC, and 55 uA at a lowest scanning rate contemplated herein. The entire radar sensor assembly (including, for example, microcontroller associated circuitry and CAN-transceiver hardware) may be configured for operation at 12 volts DC. Peak RF sweep power may be around 4.6 W.

A child car seat may be defined as a seat structured to be interposed between a child and a conventional vehicle seat installed in the vehicle. Various characteristics of the child car seat may be determined from analysis of the point cloud(s) generated using the radar scans of the car seat. A "determined characteristic" of a child car seat is a characteristic of the car seat or related to the car seat which is either detectible by the radar sensor or determinable from the radar sensor data.

Figure 3A:
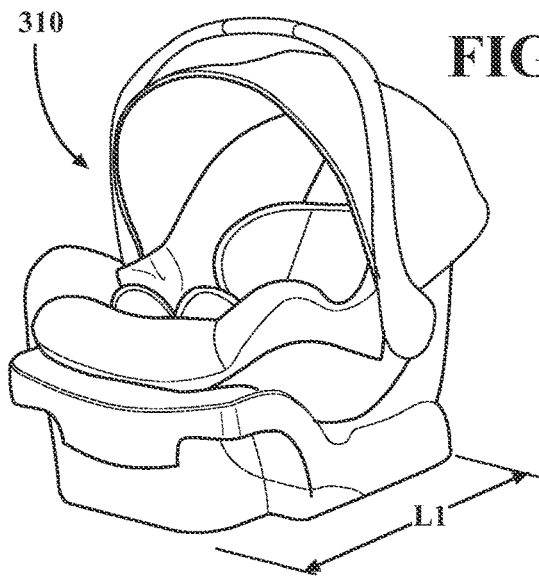
FIG. 3A is a schematic perspective view of an infant-only child car seat in accordance with an embodiment described herein.
Figure 3B:
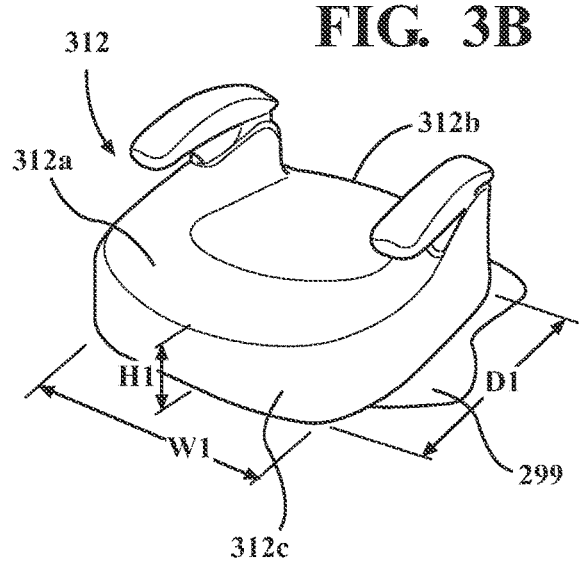
FIG. 3B is a schematic perspective view of a child booster seat in accordance with an embodiment described herein.
Figure 3C:
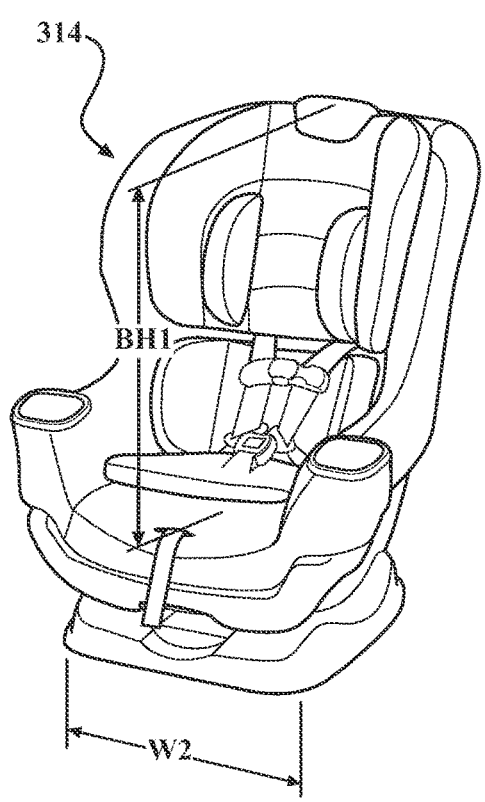
FIG. 3C is a schematic perspective view of a convertible child car seat in accordance with an embodiment described herein.
Figure 3D:
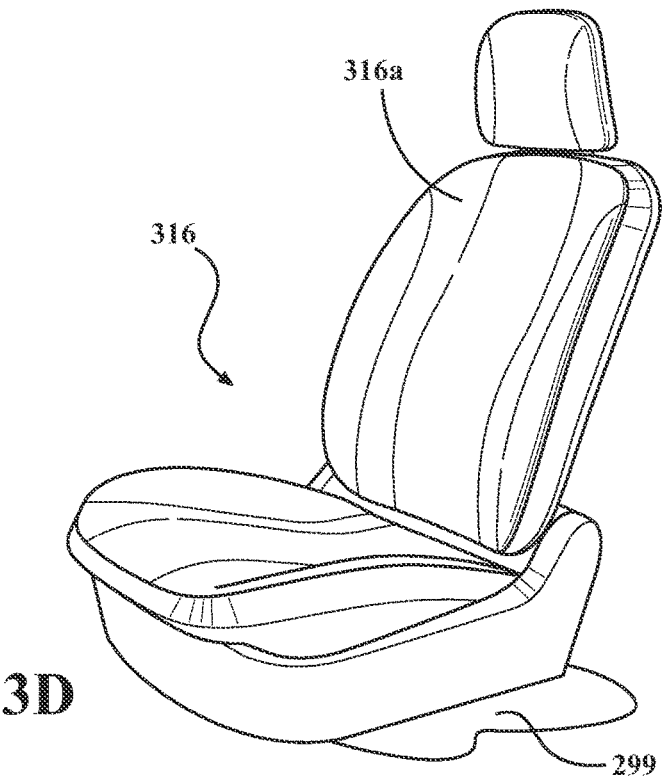
FIG. 3D is a schematic perspective view of a conventional vehicle seat for purposes of comparison with the child car seats of FIGS. 3A-3C.

Examples of various types of child car seats are shown in FIG. 3A-3C. FIG. 3D shows a conventional vehicle seat for purposes of comparison with the child car seats. When a child has outgrown the child car seats in FIGS. 3A-3C, the child may be seated in a conventional seat as shown in FIG. 3D. Examples of child car seat characteristics which may be determined from radar scan information include the type of car seat (for example, an infant only seat, a convertible seat, a booster seat, or a regular vehicle seat with the child belted in), a position or seating zone in the vehicle in which the child car seat resides, a position of the child car seat in relation to airbags deployable from vehicle interior surfaces, an orientation of the child car seat, particular dimensions of the car seat depending on its type, and other characteristics. A convertible child car seat may be defined as a seat which is adjustable to transition from a rear-facing seat to a forward-facing seat, and which may also be capable of transitioning to a booster seat.

Certain dimensions of the child car seat may depend on the type of car seat. FIGS. 3A-3C show various types of child car seats 310-316 and associated dimensional parameters which may be relevant to the suitability of each respective seat type for the purpose of securing a child therein. Referring to FIGS. 3A-3C, the radar sensor 109 may be configured to detect values of various parameters and dimensions of the child car seat. Examples of determinable dimensions may include a length L of the car seat (such as length L1 of an infant-only car seat 310 (FIG. 3A), a depth D of the car seat (such as depth D1 of a child booster seat 312 as shown in FIG. 3B and measured from a rear edge 312*b* of the child seat bottom 312*a* in contact with a vehicle seat back to a front edge 312*c* of the child seat bottom 312*a*), a height H (such as height H1 of FIG. 3B) to which the child seat bottom 312*a* extends above the vehicle seating surface 299 on which the car seat resides, a width W of the car seat (such as width W1 of the booster seat 312 shown in FIG. 3B or width W2 of the convertible child car seat 314 shown in FIG. 3C), a height BH (such as height BH1 shown in FIG. 3C) to which a seat back 316*a* of a convertible child car seat 316 extends above a vehicle seating surface 299 on which the car seat resides, and other dimensions.

Information relating to various characteristics of the vehicle may be programmed and/or stored in vehicle information 116 in data stores 115 and/or in the sensor control module 117. For example, the sensor system 120 or data stores 115 may be programmed with details of the vehicle interior, including the number of seats (for example, five seats defined in terms of seating zones) available to occupants, a reference location of each of seating zones A, B, and D-F and of other radar-scan zones (such as zones B and G) with respect to the radar sensor, pertinent boundaries and dimensions of each zone, locations and dimensions of key vehicle interior surfaces, and other locations and parameters pertinent to detecting the conditions and performing the operations described herein. The system may use an initial baseline scan from when the vehicle is empty as a point of comparison against a previous or current radar scan to distinguish between separate added objects. Machine learning algorithms employing neural networks may also be used to teach the sensor to recognize, classify and track various objects and conditions in the vehicle.

FIG. 2 is a schematic plan view of a vehicle interior showing an exemplary vehicle seating arrangement of five seats 202*a*-202*e* and associated seating zones A, B, and D-F, along with an additional floor zone C and a cargo zone G. Each seating zone may be structured to seat a single occupant during movement of the vehicle. To this end, each seating zone may include an associated seat belt (not shown). The MMW radar may be configured to monitor each seating zone for child car seats and for occupants.

In one or more arrangements, vehicle interior zones may include front seating zones (including a driver side zone A and a passenger side zone B) and rear seating zones D-F located behind the front seats and rearwardly of the floor zone C. Individual rear seating zones may be defined with respect to locations of individual seats (as shown in FIG. 2) or with respect to locations of seat belts installed in a continuous "bench"-type rear seat. In addition, a radar-scannable floor zone C may be located between the front and rear seats, and a cargo zone G may be located behind the rear seats (in a hatchback cargo area, for example). The details and pertinent dimensions of the vehicle interior may be particular to each make and model of vehicle and may be programmed into a memory for reference and comparison with radar information using known methods.

The MMW radar 109 may be "trained" to recognize, with a high degree of accuracy and repeatability, various conditions in the vehicle interior. Training may be performed through programming, by repeated exposure to each condition, and/or by other known methods. In one or more arrangements, the MMW radar may be trained to recognize various unsafe occupant seating conditions.

In one or more arrangements, example point cloud representations of different types and sizes of child car seats may be saved in memory (in child car seat comparison information 111) for comparison with point clouds generated from current radar scans of the vehicle. Different types of child car seats may be distinguished from each other by measurement of distances of edges and other surfaces of the car seats from the radar sensor 109, distances of the edges and other surfaces from the vehicle seat on which the car seat rests, from comparison of the generated point clouds with reference point clouds stored in child car seat comparison information 111, and from comparison with dimensions of similarly-configured child car seats stored in memory, for example.

In addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, etc. As an example, in one or more arrangements, the environment sensors 122 can include one or more radar sensors, one or more LIDAR sensors, one or more sonar sensors, and/or one or more cameras (not shown).

The vehicle wireless communications interface 169 may be configured to enable and/or facilitate communication between the components and systems of the vehicle and entities (such as cloud facilities, cellular and other mobile communications devices, other vehicles, etc.) exterior of the vehicle. For example, an alert caused by operation of the sensor control module 117 (described in greater detail below) may be transmitted to an off-vehicle person or facility via the wireless communications interface 169.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In particular embodiments, the input system 130 may include buttons and/or switches enabling a user to stop or start the vehicle simply by actuating the buttons/switches. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, one or more airbag system(s) 186, a transmission system 145, and/or a navigation system 147. Each of these systems can include one or more devices, components, and/or a combination thereof, now known or later developed.

The propulsion system 141 may include an engine (not shown) of the vehicle. The engine may be an internal combustion engine in a conventionally-powered vehicle, an internal combustion engine or an electric motor in a Hybrid electric-petroleum vehicle, or an electric motor in a fully electrically-powered vehicle, for example. The engine may be turned on in a conventional manner by activation of an ignition switch. In one or more arrangements, the ignition switch may be configured to be activatable by a human driver or vehicle occupant. In certain embodiments, the ignition switch may be configured to be turned "on" or "off" autonomously by a command from processor(s) 110 under instructions from one of the modules, such as sensor control module 117.

In one or more arrangements, the transmission system 145 may be configured to be actuatable responsive to control commands generated by the sensor control module 117 when an unsafe seating condition is detected in the vehicle. For example, the vehicle may be configured to enable a user to use the input system 130 to select an option whereby the sensor control module 117 automatically generates a signal preventing shifting of the transmission to a "drive" mode if an inappropriate child car seat or child seating condition is detected, and until the command preventing shifting is manually over-ridden by a user.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The airbag system(s) 186 may include various types of airbags positioned at various locations in the vehicle and configured to be deployed in the event of a vehicle collision, for example. Deployment of airbags in certain positions may endanger a child seated in a child car seat positioned opposite the airbag. For example, deployment of an airbag from the vehicle dashboard opposite a front passenger seat when a child car seat is positioned in the front passenger seat may be harmful to a child secured in the car seat. Consequently, at least some of the airbags and/or airbag system(s) may be configured to be disabled by a user if desired.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160 and/or the sensor control module(s) 117. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles and/or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110 and/or by one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the user vehicle so as to drive the vehicle along a travel route, from an initial or start location to a destination.

The processor(s) 110, the sensor control module 117, and/or the autonomous driving module(s) 160 can be operably connected to communicate with the other elements of the vehicle, including various vehicle systems 140 and/or individual components thereof. For example, returning to FIG. 1, the processor(s) 110, the sensor control module 117 and/or the autonomous driving module(s) 160 can be in communication to send and/or receive information from the various vehicle systems 140 to control the movement, speed, maneuvering, heading, direction, etc. of the vehicle 100. The processor(s) 110, the sensor control module 117 and/or the autonomous driving module(s) 160 may control some or all of these vehicle systems 140 and, thus, may be partially or fully autonomous.

The processor(s) 110, the sensor control module 117, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

In one or more arrangements described herein, a system for controlling operation of a vehicle one or more of vehicle sensors 121 for monitoring an occupant compartment of a vehicle may include the processor(s) 110 and memory 112 communicably coupled to the processor(s) 110 and storing the sensor control module 117. The sensor control module 117 can be configured to receive data from one or more sensors of the sensor system 120 and/or any other type of system capable of capturing information relating to the vehicle 100.

The sensor control module 117 may include computer-readable instructions that, when executed by the processor(s) 110, cause the processor(s) to use sensor data and/or other information to make determinations and perform (or cause performance of) operations as described herein. The vehicle 100 may include any and all sensors, mechanisms, systems (in the form of software and/or hardware), etc., needed for the sensor control module 117 to detect conditions and/or events and to make determinations based on the considerations and using the information described herein and any other available information. The sensor control module 117 may include computer-readable instructions that, when executed by the processor(s) 110, cause the processor(s) to activate, deactivate, and/or otherwise control vehicle components and/or systems and aspects of vehicle operation as described herein, responsive to information acquired by the vehicle sensors and/or the occurrence of other conditions and events. The sensor control module 117 may be configured to operate in conjunction with the autonomous driving module(s) 160 and/or any other vehicle component and/or system to control any operations of the vehicle 100 as described herein.

In one or more arrangements, the sensor control module 117 may include including computer-readable instructions that when executed by the processor(s) cause the processor(s) to automatically control operation of the radar sensor to perform at least one radar scan of at least a portion of an interior of the vehicle. The portion of the vehicle interior may include the vehicle seats and any child car seats positioned on the vehicle seats. The sensor control module 117 may be configured to determine, using information acquired by the radar scan(s) of the vehicle interior, at least one characteristic of a child car seat positioned in the interior. The sensor control module 117 may be configured to compare the determined characteristic(s) of the child car seat with child car seat comparison information 111 stored in data stores 115 or available off-vehicle (for example, in a cloud source) using communications interface 169. The sensor control module 117 may be configured to then, responsive to the comparison of the at least one determined characteristic(s) with the child car seat comparison information, control an operation of the vehicle.

Controlling an operation of the vehicle 100 may include controlling operation of some portion of the vehicle to perform a specific task or function. Control of some operations may be implemented automatically responsive to a detected inappropriate child car seat condition or child seating condition.

For example, in one or more arrangements, operation of the vehicle may be controlled by controlling operation of the output system 135 to generate an alert directed to a human user and indication a particular condition detected by the MMW radar 109. In particular embodiment, a schematic diagram of the vehicle interior may be displayed on a screen display of the output system 135 or a cellular device, illustrating a nature of the alerted condition and its location in the vehicle interior.

The sensor control module 117 may control operation of the output system 135 to generate an alert associated with any detected inappropriate child car seat condition or child seating condition, as determined by evaluation of radar sensor data and with reference to the guidelines and rules stored in child car seat comparison information 111. For example, alerts may be generated to inform a user that a child not currently seated in a child car seat should be seated in a child car seat due to the determined height and/or weight of the child, that a child may have outgrown the child car seat he is currently seated in, and/or that child car seat appears to be seated in the wrong direction. The sensor control module 117 may control operation of the output system 135 to generate an alert indicating that a vehicle airbag deployable from a surface positioned opposite and forwardly of a child car seat should be deactivated, to prevent injury to the seated child by deployment of the airbag.

The sensor control module 117 may control operation of the output system 135 to generate an alert indicating that, for a child car seat positioned in the front passenger seat, the front passenger seat should be moved back as far in the vehicle as it can go (e. g., to a maximum attainable distance of a seat bottom of the front passenger seat from a surface positioned opposite and forwardly of the front passenger seat and from which a vehicle airbag is structured to deploy), also to prevent injury to the seated child by deployment of the airbag.

The sensor control module 117 may control operation of the output system 135 to generate an alert indicating that the child car seat instructions and/or the manufacturer should be consulted regarding a possible existence of an inappropriate child car seat condition. This alert may be generated, for example, when a particular condition or set of conditions is determined by radar data analysis, but there appears to be no applicable comparison information stored in the child car seat comparison information 111.

Any of the alerts described herein may be in any suitable form, such as audible, visual, tactile or a combination of these. Following generation of the at least a first alert, additional alerts may be generated if the first alert is not acknowledged. Successive alerts may increase in intensity and involve the transmission of messages via a wide variety of media, and to a wide variety of recipients. Any alerts generated may include a request for response or acknowledgement of receipt of the alert by the recipient.

Various vehicle control functions and responses to radar scan information may also be selectable by a user through the input system 130. For example, the sensor control module 117 may include instructions enabling user selection of an option by which an alert notifies the user when the child car seat currently present in the car appears to satisfy applicable guideline and rules.

In another example, the sensor control module 117 may include instructions enabling user selection of an option by which operation of the vehicle may be controlled by automatically preventing implementation of a control command whose execution will result in movement of the vehicle, until receipt of a generated alert has been acknowledged by a human user.

In another example, the sensor control module 117 may include instructions enabling user selection of an option by which operation of the vehicle may be controlled by automatically preventing implementation of a control command whose execution will result in movement of the vehicle, until an inappropriate condition involving a child and/or child car seat has been resolved.

In another example, the sensor control module 117 may be configurable by a user (using the input system 130, for example) to automatically deactivate an airbag deployable from a surface positioned opposite and forwardly of the child car seat when a car seat is detected at such a location.

In another example, the sensor control module 117 may be configurable by a user to, for a child car seat positioned in the front passenger seat, automatically move the front passenger seat to the maximum attainable distance of a seat bottom of the front passenger seat from a surface positioned opposite and forwardly of the front passenger seat and from which a vehicle airbag is structured to deploy).

Control of other operations of the vehicle responsive to conditions detected by the MMW radar 109 is also contemplated.

In one or more arrangements, the sensor control module 117 may be configured to determine, using information acquired by a radar scan, if a child is positioned in a child car seat detected by a radar scan. The sensor control module 117 may also be configured to determine, if a child is positioned in the child car seat, and using information acquired by a radar scan, at least one characteristic of the child positioned in the child car seat. The sensor control module 117 may also be configured to compare the at least one determined characteristic of the child with the child car seat comparison information. The sensor control module 117 may also be configured to, responsive to the comparison of the at least one determined characteristic of the child with the child car seat comparison information, control an operation of the vehicle, for example, in one of the ways previously described.

A "determined characteristic" of a child seated in a child car seat or in a vehicle seat may be a characteristic which is either detectible by the radar sensor or determinable from the radar sensor data. Examples of child characteristics which may be determined from radar scan information include density, height, girth, and weight. The weight of the child may be estimated from the child density and the child height and girth, which may be used to estimate the child's volume. Alternatively, the child's volume may be estimated from other methods of processing the point cloud. Other useful information, such as the age of the child and weight and height limits of a child for a particular model of child car seat, may be entered into the data stores or other memory directly by a user.

In one or more arrangements, the at least one characteristic of the child car seat includes a type of child car seat, and the at least one determined characteristic of the child positioned in the child car seat includes a height and a weight of the child. Values of these parameters may provide a basis for comparison with child car seat comparison information 111 sufficient to enable detection of a wide variety of inappropriate child car seat and child seating conditions. In one or more arrangements, the child car seat comparison information may include information relating the height and weight of the child to one or more types of child car seats appropriate for a child having the height and weight. The child car seat comparison information may include information relating the height and weight of the child and the type of child car seat to at least one appropriate position of the type of child car seat in the vehicle for a child having the height and weight. In one or more particular arrangements, the at least one characteristic of a child car seat may include a position of the child car seat, and the child car seat comparison information may include information relating the height and weight of the child to at least one appropriate orientation of a child car seat located in the current position of the child car seat, for a child having the height and weight.

In one or more particular arrangements, the sensor control module 117 may include computer-readable instructions that when executed by the processor(s) cause the processor(s) to determine, using information acquired by a radar scan, that a child is in the vehicle interior and not in a child car seat. The sensor control module 117 may also be configured to determine, using information acquired by a radar scan, at least one characteristic of the child positioned in the vehicle interior and not in a child car seat. The sensor control module 117 may be configured to compare the at least one determined characteristic of the child with the child car seat comparison information. The sensor control module 117 may be configured to, responsive to the comparison of the at least one determined characteristic of the child with the child car seat comparison information, control an operation of the vehicle. For example, if analysis of the radar data determines that a child not seated in a car seat actually should be seated in a car seat (because of the child's height, for example), the sensor control module may control the output system to generate an alert to this effect.

In certain positions of the child car seat in the vehicle, a child seated in the car seat may be injured if an airbag deploys from a surface positioned opposite and forwardly of the child car seat. Such a case is shown in FIG. 5, which illustrates a child car seat positioned in seating zone D and where an airbag 90 may be configured to deploy from behind the front passenger seat 202*b* responsive to a collision event. When a child car seat is positioned in such a location, it may be advisable to deactivate the airbag for the safety of the child.

To this end, in one or more arrangements, the sensor control module 117 may be configured to compare at least one characteristic of the child car seat to vehicle information 116. In particular arrangements, the vehicle information may include position(s), relative to a position of the radar sensor 109, of one or more surfaces from which a vehicle airbag is structured to deploy. Also, determined characteristics of the child car seat may include a position of the car seat in the vehicle interior and a position of the child car seat with respect to a surface positioned opposite and forwardly of the child car seat and from which a vehicle airbag is structured to deploy. In addition, the child car seat comparison information 111 may include information regarding whether or not an airbag deployable from the surface positioned opposite and forwardly of the child car seat should be deactivated if a child car seat is positioned opposite and rearwardly of the surface. In such an arrangement, comparison of the determined characteristics of the child car seat with the child car seat comparison information may determine whether or not one or more vehicle airbags need to be deactivated for the safety of a child in the car seat.

Figure 6:
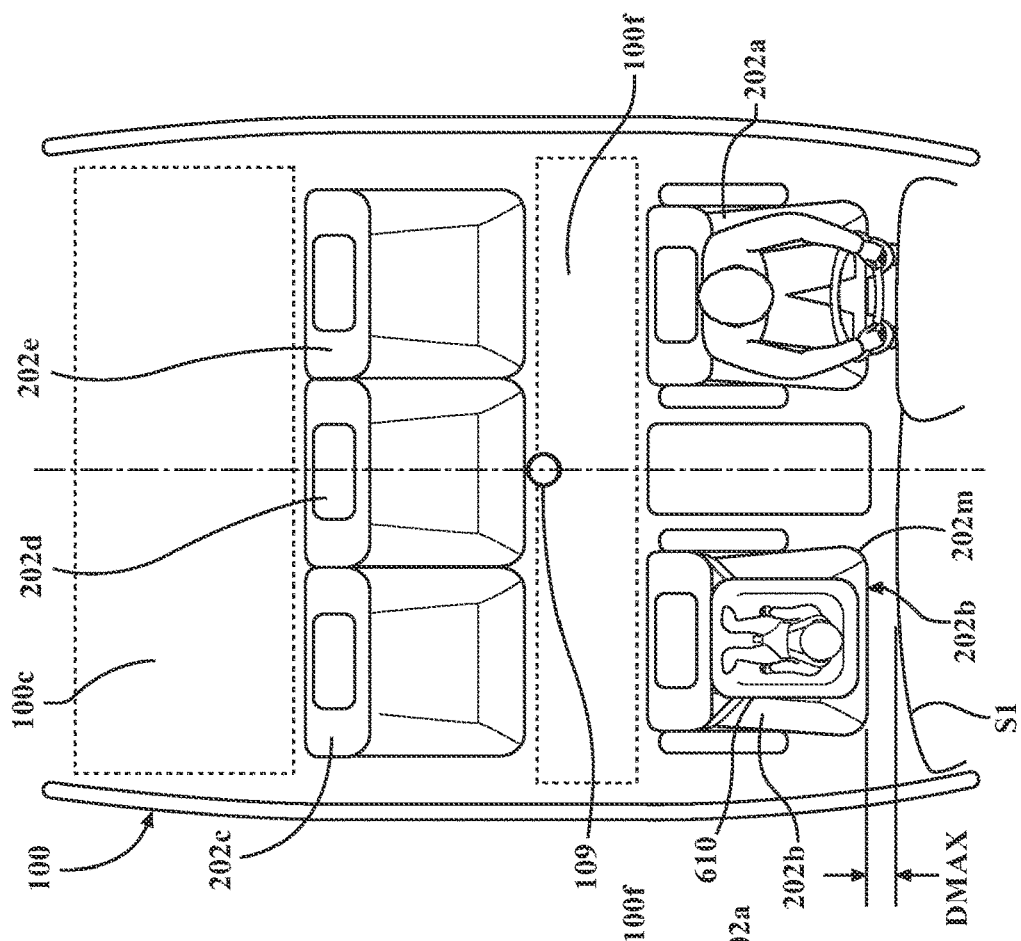
FIG. 6 is a schematic plan view of the vehicle similar to the view of FIG. 2, showing a child in a rearwardly-facing child car seat positioned in the front passenger seat and opposite a dashboard or other surface from which an airbag may deploy.

Referring to FIG. 6, in one or more arrangements, the sensor control module 117 may include computer-readable instructions that when executed by the processor(s) cause the processor(s) to compare the at least one characteristic of the child car seat to vehicle information. In one or more arrangements, the vehicle information may include a maximum attainable distance DMAX of a seat bottom of a front passenger seat 202*b* of the vehicle from a surface S1 positioned opposite and forwardly of the front passenger seat and from which a vehicle airbag is structured to deploy. The child car seat 610 may be positioned in the front passenger seat 202*b*, and the at least one characteristic of the child car seat 610 may include a position of the seat bottom 202*m* of the front passenger seat 202*b* relative to the maximum attainable distance DMAX. In such an arrangement, comparison of the determined characteristics of the child car seat 610 with the child car seat comparison information may determine whether or not the bottom 202*m* of the vehicle seat 202*b* is currently positioned at the maximum attainable distance DMAX. If not, the vehicle seat 202*b* may need to be moved rearwardly to the maximum attainable distance DMAX for the safety of a child in the car seat 610.

Figure 7:
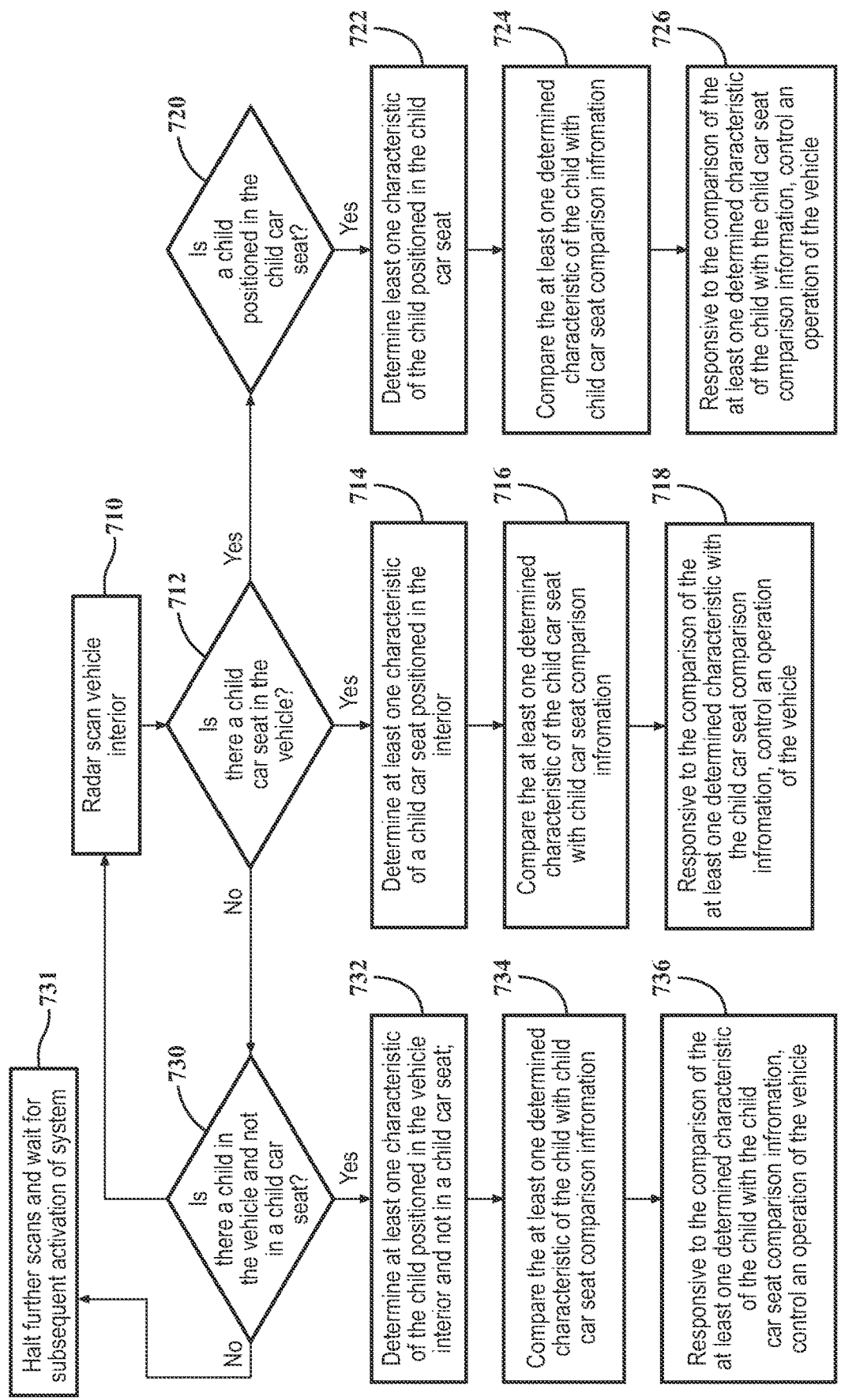
FIG. 7 is a flow diagram illustrating operations of the vehicle radar sensor to scan an interior of the vehicle and control one or more operations of the vehicle responsive to sensor data.
Figure 7A:
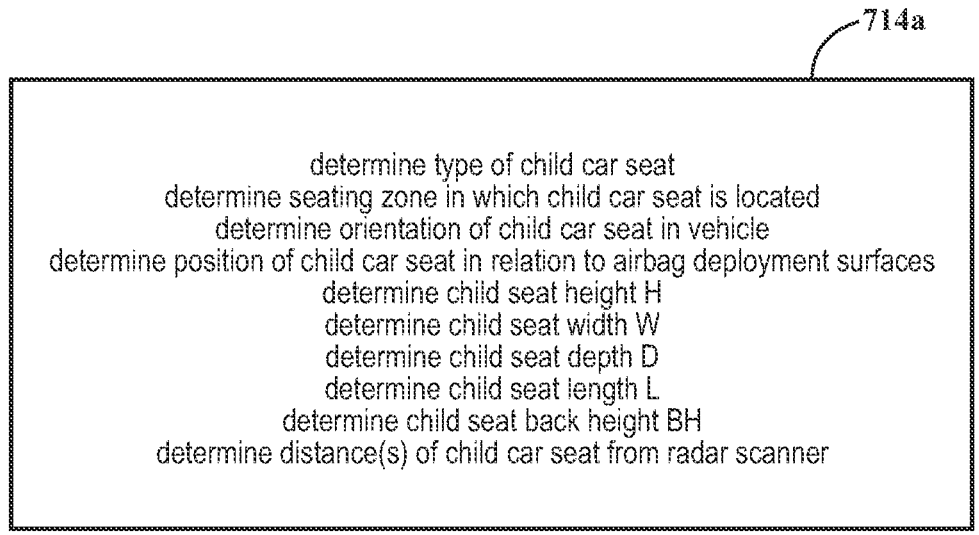
FIG. 7A illustrates non-exclusive examples of various characteristics of a child car seat which may be determined from radar scan information obtained in a step performed in the flow diagram of FIG. 7.
Figure 7B:
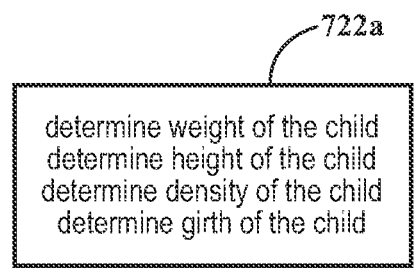
FIG. 7B illustrates non-exclusive examples of various characteristics of a child which may be determined from radar scan information obtained in a step performed in the flow diagram of FIG. 7.
Figure 7C:
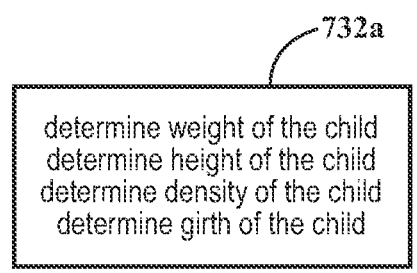
FIG. 7C illustrates non-exclusive examples of various characteristics of a child which may be determined from radar scan information obtained in another step performed in the flow diagram of FIG. 7.

FIGS. 7-7C are flow diagrams illustrating operations of the vehicle radar sensor 109 to scan an interior of the vehicle and control one or more operations of the vehicle responsive to radar sensor data. Referring to FIG. 7, the sensor control module 117 may (in block 710) automatically control operation of the radar sensor 109 to perform at least one radar scan of at least a portion of an interior of the vehicle 100. Performance of the radar scan may be prompted by, for example, a door of the vehicle being opened, an engine of the vehicle being started, or by a user pressing a button to manually activate the child car seat detection and comparison functions. The sensor control module 117 may then (in block 712), based on radar scan information, determine if there is a child car seat positioned in the vehicle interior. If there is a child car seat positioned in the vehicle interior, the sensor control module 117 may (in block 714) determine, using information acquired by the at least one radar scan of the vehicle interior, at least one characteristic of the child car seat positioned in the interior. Block 714*a* (FIG. 7A) shows non-exclusive examples of various characteristics of the child car seat which may be determined in block 714 from the radar scan information. The sensor control module 117 may then (in block 716) compare the at least one determined characteristic of the child car seat with child car seat comparison information, in a manner previously described. The sensor control module 117 may then (in block 718), responsive to the comparison of the at least one determined characteristic with the child car seat comparison information, control an operation of the vehicle in a manner previously described.

Execution of blocks 710-718 may determine if a child car seat currently installed in the vehicle satisfies applicable the guidelines and rules stored in car seat comparison information 111. One or more operations of the vehicle the vehicle may then be controlled accordingly. Blocks 710-718 may be executed whether or not a child is seated in the car seat. If blocks 710-718 are executed with no child in the car seat, information acquired and/or derived from the radar scans may be stored in a memory for later use in comparison when a child is determined to be in the car seat.

Returning to block 712, if there is a child car seat positioned in the vehicle, the sensor control module 117 may also (in block 720) determine, using information acquired by the at least one radar scan, if a child is positioned in the child car seat. If a child is positioned in the car seat, the sensor control module 117 may (in block 722), using information acquired by the at least one radar scan, determine at least one characteristic of the child positioned in the child car seat. Block 722*a* (FIG. 7B) shows non-exclusive examples of various characteristics of the child which may be determined in block 722 from the radar scan information. The sensor control module 117 may then (in block 724) compare the at least one determined characteristic of the child with the child car seat comparison information. The sensor control module 117 may then (in block 726), responsive to the comparison of the at least one determined characteristic of the child with the child car seat comparison information, control an operation of the vehicle as previously described.

Execution of blocks 720-726 may determine if a child/child car seat combination currently positioned in the vehicle satisfies applicable the guidelines and rules stored in car seat comparison information 111. One or more operations of the vehicle the vehicle may then be controlled accordingly.

Returning again to block 712, if there is no child car seat positioned in the vehicle, the sensor control module 117 may (in block 730) determine from radar scan information if a child is currently in the vehicle interior but not in a child car seat. If there is no child in the vehicle but not in a car seat, the sensor control module 117 may (in block 731) halt further radar scans and wait for a subsequent activation of the system, for example, the next time the vehicle engine is turned on after being turned off. If a child is currently in the vehicle interior but not in a child car seat, the sensor control module 117 may (in block 732) determine, using information acquired by a radar scan, at least one characteristic of the child positioned in the vehicle interior and not in a child car seat. Block 732a (FIG. 7C) shows non-exclusive examples of various characteristics of the child which may be determined in block 722 from the radar scan information. The sensor control module 117 may then (in block 734) compare the at least one determined characteristic of the child with the child car seat comparison information. The sensor control module 117 may then (in block 736), responsive to the comparison of the at least one determined characteristic of the child with the child car seat comparison information, control an operation of the vehicle.

Execution of blocks 730-736 may determine if a child not currently seated in a child car seat should be seated in a car seat (due to, for example, the height and/or weight of the child) in accordance with applicable the guidelines and rules stored in car seat comparison information 111. One or more operations of the vehicle the vehicle may then be controlled accordingly.

Use of the components, systems and methods described herein enables a user to be informed regarding child car seat conditions and child seating conditions which may not satisfy applicable rules or guidelines. For example, by use of the components, systems and methods described herein, the user may be informed as to whether or not a given car seat is the right size and/or type for given child, the appropriateness of the current orientation and/or position of a car seat, whether or not any vehicle airbags should be deactivated for the safety of a child positioned in the car seat, the appropriateness of the current position in which a given child is seated, and other conditions affecting seating of the child.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling operation of a vehicle, the system comprising:
   a millimeter-wave radar sensor;
   a processor; and
   a memory communicably coupled to the processor and storing a sensor control module including computer-readable instructions that when executed by the processor cause the processor to:
   automatically control operation of the radar sensor to perform at least one radar scan of at least a portion of an interior of the vehicle;
   determine, using information acquired by the at least one radar scan, at least one characteristic of a child car seat positioned in the interior, the at least one characteristic including a type of child car seat including any of at least an infant-only child car seat, a child booster seat, and a convertible child car seat;
   compare the type of child car seat with child car seat comparison information related to the determined type of child car seat, to determine if an inappropriate child car seat condition exists; and
   responsive to existence of an inappropriate child car seat condition, control an operation of the vehicle.

2. The system of claim 1 wherein the sensor control module includes computer-readable instructions that when executed by the processor cause the processor to:
   determine, using information acquired by the at least one radar scan, if a child is positioned in the child car seat;
   determine, if a child is positioned in the child car seat, and using information acquired by the at least one radar scan, at least one characteristic of the child positioned in the child car seat;
   compare the at least one determined characteristic of the child with child car seat comparison information relating the at least one determined characteristic of the child with the determined type of child car seat, to determine if an inappropriate child seating condition exists; and
   responsive to a determined existence of an inappropriate child seating condition, control an operation of the vehicle.

3. The system of claim 2 wherein the at least one determined characteristic of the child positioned in the child car seat includes a height and a weight of the child.

4. The system of claim 3 wherein the child car seat comparison information includes information relating the height and weight of the child to one or more types of child car seats appropriate for a child having the height and weight.

5. The system of claim 3 wherein the child car seat comparison information includes information relating the height and weight of the child and the type of child car seat to at least one appropriate position of the type of child car seat in the vehicle for a child having the height and weight.

6. The system of claim 3 wherein the at least one characteristic of a child car seat further includes a position of the child car seat and wherein the child car seat comparison information includes information relating the height and weight of the child to at least one appropriate orientation of a child car seat located in the position of the child car seat, for a child having the height and weight.

7. A system for controlling operation of a vehicle, the system comprising:
   a millimeter-wave radar sensor;
   a processor; and
   a memory communicably coupled to the processor and storing a sensor control module including computer-readable instructions that when executed by the processor cause the processor to:
   automatically control operation of the radar sensor to perform at least one radar scan of at least a portion of an interior of the vehicle;
   determine, using information acquired by the at least one radar scan of the vehicle interior, at least one characteristic of a child car seat positioned in the interior, the at least one characteristic of the child car seat including that the child car seat is positioned in a front passenger seat of the vehicle and a position of a seat bottom of the front passenger seat;
   compare the position of the seat bottom of the front passenger seat to a maximum attainable distance of the seat bottom from a surface positioned opposite and forwardly of the front passenger seat and from which a vehicle airbag is structured to deploy; and
   responsive to the comparison of the position of the seat bottom of the front passenger seat to the maximum attainable distance, control an operation of the vehicle.

8. The system of claim 7 wherein the sensor control module includes computer-readable instructions that when executed by the processor cause the processor to control operation of the vehicle to automatically move the front passenger seat to the maximum attainable distance from the surface responsive to a determination, based on a comparison of the position of the seat bottom with the maximum attainable distance, that the seat bottom is not currently positioned at the maximum attainable distance from the surface.

9. A method for controlling operation of a vehicle, comprising steps of:
   automatically controlling operation of a millimeter-wave radar sensor to perform at least one radar scan of at least a portion of an interior of the vehicle;
   determining, using information acquired by the at least one radar scan, at least one characteristic of a child car seat positioned in the interior, the at least one characteristic including a type of child car seat including any of at least an infant-only child car seat, a child booster seat, and a convertible child car seat;

comparing the type of child car seat with child car seat comparison information related to the determined type of child car seat, to determine if an inappropriate child car seat condition exists; and responsive to existence of an inappropriate child car seat condition, controlling an operation of the vehicle.

10. The method of claim 9 further comprising steps of:

determining, using information acquired by the at least one radar scan, if a child is positioned in the child car seat;

determining, if a child is positioned in the child car seat, and using information acquired by the at least one radar scan, at least one characteristic of the child positioned in the child car seat;

comparing the at least one determined characteristic of the child with child car seat comparison information relating the at least one determined characteristic of the child with the determined type of child car seat, to determine if an inappropriate child seating condition exists; and responsive to a determined existence of an inappropriate child seating condition, controlling an operation of the vehicle.

11. The method of claim 10 wherein the at least one determined characteristic of the child positioned in the child car seat includes a height and a weight of the child.

12. The method of claim 11 wherein the child car seat comparison information includes information relating the height and weight of the child to one or more types of child car seats appropriate for a child having the height and weight.

13. The method of claim 11 wherein the child car seat comparison information includes information relating the height and weight of the child and the type of child car seat to at least one appropriate position of the type of child car seat in the vehicle for a child having the height and weight.

14. The method of claim 11 wherein the at least one characteristic of a child car seat further includes a position of the child car seat, and wherein the child car seat comparison information includes information relating the height and weight of the child to at least one appropriate orientation of a child car seat located in the position of the child car seat, for a child having the height and weight.

15. A method for controlling operation of a vehicle, comprising steps of:

automatically controlling operation of a millimeter-wave radar sensor to perform at least one radar scan of at least a portion of an interior of the vehicle;

determining, using information acquired by the at least one radar scan, a position of a seat bottom of a front passenger seat of the vehicle in which a child car seat is positioned;

determining that the seat bottom is not positioned at a maximum attainable distance of the seat bottom from a surface positioned opposite and forwardly of the front passenger seat and from which a vehicle airbag is structured to deploy; and responsive to the determination that the seat bottom is not at the maximum attainable distance, generating an alert indicating that the front passenger seat should be moved to the maximum attainable.

16. A non-transitory computer readable medium having stored therein instructions, that when executed by a computing system, cause the computing system to perform functions comprising:

automatically controlling operation of a millimeter-wave radar sensor to perform at least one radar scan of at least a portion of an interior of a vehicle;

determining, using information acquired by the at least one radar scan, at least one characteristic of a child car seat positioned in the interior, the at least one characteristic including a type of child car seat including any of at least an infant-only child car seat, a child booster seat, and a convertible child car seat;

comparing the type of child car seat with child car seat comparison information related to the determined type of child car seat, to determine if an inappropriate child car seat condition exists; and responsive to existence of an inappropriate child car seat condition, controlling an operation of the vehicle.

17. The system of claim 1, wherein the child car seat comparison information includes at least any of suitable positions the type of car seats in the vehicle, and a direction which the type of child car seat should be facing according to a given position in the vehicle.

* * * * *